United States Patent [19]
Schutte

[11] 3,869,384
[45] Mar. 4, 1975

[54] TAILINGS DISPOSAL SYSTEM FOR TAR SANDS PLANT

[75] Inventor: Robert Schutte, Sherwood Park, Alberta, Calif.

[73] Assignees: Canada-Cities Service Ltd.; Imperial Oil Limited; Atlantic Richfield Canada Ltd.; Gulf Oil Canada Limited

[22] Filed: Jan. 21, 1974

[21] Appl. No.: 435,226

[52] U.S. Cl. .................. 210/44, 210/73, 210/83
[51] Int. Cl. ............................................ B01d 21/00
[58] Field of Search ............ 210/44, 45, 73, 83, 84, 210/220, 221; 208/11

[56] References Cited
UNITED STATES PATENTS

| | | | |
|---|---|---|---|
| 3,526,585 | 9/1970 | Camp | 210/44 X |
| 3,661,774 | 5/1972 | Masologities | 210/83 X |
| 3,707,464 | 12/1972 | Burns et al. | 210/44 |
| 3,723,309 | 3/1973 | Gaacia | 210/44 |
| 3,764,008 | 10/1973 | Barley et al. | 210/73 |

Primary Examiner—John Adee
Attorney, Agent, or Firm—Ernest Peter Johnson

[57] ABSTRACT

This invention has to do with the treatment of the tailings stream from a hot water extraction plant for recovering bitumen from tar sand. This stream comprises water and coarse and fine solids. The stream is fed into a mined-out cavity to settle the coarse solids. Some of the decanted water from the cavity is transferred to a large settling pond for clarification. The remainder of the decanted water is returned to the plant and added to the tailings stream to fluidize it and render it pumpable. The process has the following advantages: some of the fines become trapped in the beach of coarse sand formed in the cavity, thereby reducing the volume of sludge which is generated in the settling pond. The use of decanted water to fluidize the tailings issuing from the extraction process reduces the amount of water needed for the extraction process itself, thereby reducing the amount of clarified water required for the plant.

2 Claims, 1 Drawing Figure

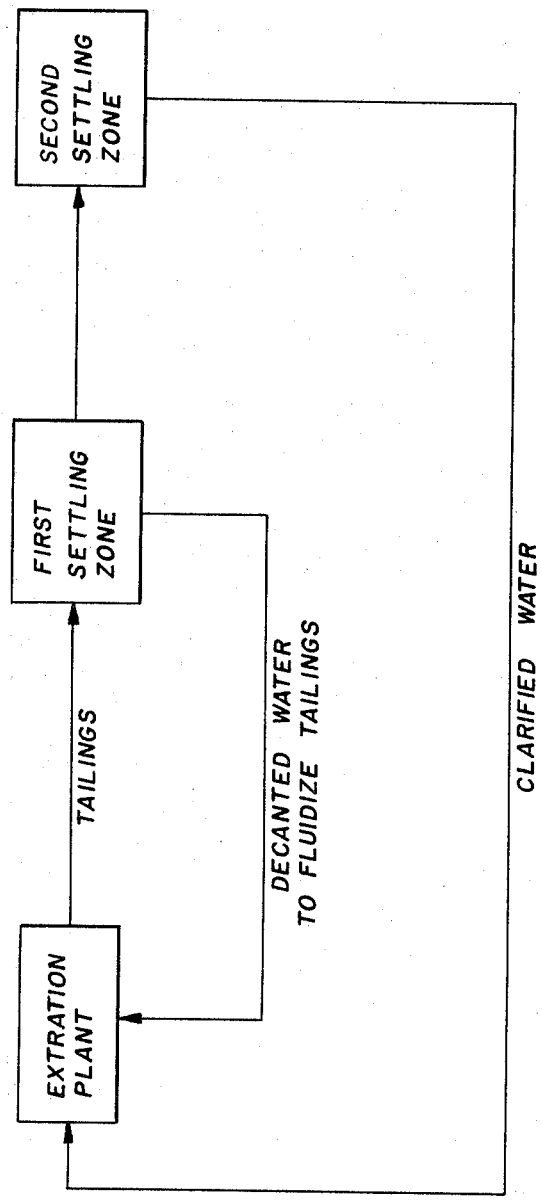

3,869,384

TAILINGS DISPOSAL SYSTEM FOR TAR SANDS PLANT

BACKGROUND OF THE INVENTION

This invention relates to an improvement of the hot water process for recovering bitumen from tar sands, and more particularly pertains to increasing the life and performance of the tailings treatment system associated with the hot water process.

A large proportion of the world's known hydrocarbon reserve exists in the form of tar sand. One large deposit of this material is found along the banks of the Athabasca River in Alberta. The tar sand exists in the form of water-wet grains of sand sheathed in films of bitumen. In treating the tar sand to recover commercially useful products, it is first necessary to separate the bitumen from the water and sand.

The method commonly employed to extract the bitumen is known as the hot water process. In the first step of this process, tar sand, hot water, and steam are fed into a rotating tumbler and mixed therein. The hot water is supplied at a temperature of about 180°F and in an amount sufficient to produce a slurry containing about 20 to 25 percent by weight water. The residence time within the tumbler is approximately 4 minutes and the exit temperature of the slurry is about 180°F. While in the tumbler, the tar sand disintegrates and at the same time air bubbles are entrained therein.

The tumbler product, having a porridge-like consistency, is passed through a screen to remove lumps and rocks, and is then flooded with additional hot water to further disperse the sand and bitumen particles. A typical flooded slurry will have a composition of 7 percent bitumen, 43 percent water, and 50 percent solids, and a temperature of 160° – 180°F.

The flooded slurry is then fed continuously into a primary separation cell. This cell is a cylindrical settler having a conical bottom. In the cell, the sand particles, particularly the coarse particles, fall to the bottom and leave through an outlet as a tailings stream. Most of the bitumen particles, which have preferentially become attached to bubbles of air, rise to the top of the cell and form bitumen froth. This froth overflows the cell wall into a launder and is removed for further treatment, with which this invention is not concerned.

A middlings stream, comprising water, silt and fine clay particles and bitumen, is continuously withdrawn from the intermediate zone of the primary cell. The purpose of withdrawing this dragstream is two fold — to remove excess water from the system, and to maintain the concentration of fines in the cell low enough to permit the aerated bitumen to rise and form froth at a reasonable rate. The middling stream is treated in a sub-aerated Denver flotation cell to recover contained bitumen as froth. A secondary tailings stream, comprising water, solids and a trace of bitumen, is produced from the bottom outlet of this secondary recovery cell.

The primary tailings stream is relatively dry and non-pumpable — typically, it may comprise 30 percent by weight water, 69.3 percent solids and 0.7 percent bitumen. The secondary tailings stream, on the other hand, is relatively fluid — typically it may have a composition of 85 percent by weight water, 14 percent solids and 1 percent bitumen. The streams are combined to provide a tailings stream which is pumpable, having a consistency of about 50 pounds of solids/50 pounds of water. It is to be noted that the amount of water added in the front end of the process is in excess of that needed for extraction — the amount is governed by the need for sufficient water in the combined tailings stream so as to render it pumpable.

The combined tailings stream is fed to a single settling pond. Here the coarse solids immediately drop out and the water is allowed to stand for at least several months to settle out suspended fines to the maximum extent possible. These fines settle very slowly; when they do settle, they form a very porous sludge whose compaction may only approach about 30 %. The clarified water, still carrying some suspended solids, is recycled to the plant as soon as the solids content is low enough for the water to be useful in the extraction process. It will be recalled that the water is used in a flotation operation; if it contains a high concentration of suspended fines, these particles will hinder the flotation of aerated bitumen in the separation cells.

It is desirable in the operation of a hot water extraction plant, to try to maintain a "closed system." That is, the only fresh water added to the process should be that needed to make up for evaporation, percolation and miscellaneous plant use. In practise, the water lost in this manner is in the order of 25 percent of the water used in the process. The balance of the water used is preferably recycled from the settling pond.

At the present time, the tar sands operations in the Athabasca region involve open-pit mining of the material. Because there is a limit to the distance which the mined material can economically be conveyed to the extraction plant, there is a finite limit on the plant life itself. This limit is presently thought to be in the order of 25 years.

At this point, two separate mechanisms need to be discussed. One is clarification of the tailings water, so that it can be re-used in the plant, and the other is the buildup of large volumes of sludge in the settling pond. Clarification depends on the lateral area of the settling pond, and hence is constant over the life of the pond. An extraction plant capable of producing 100,000 barrels of bitumen per day would require a settling pond having a length and width in the order of three miles, respectively. It has been calculated that three barrels of sludge are produced for each barrel of synthetic crude product from a plant of this type. It will therefore be appreciated that there is a rapid buildup in sludge volume and the only way to accomodate this buildup is to increase the height of the settling pond dike. This is an expensive proposition.

SUMMARY OF THE INVENTION

With the foregoing background in mind, it is one object of this invention to provide improvements to the process for recovering bitumen from tar sand whereby the life and efficiency of the settling system may be increased.

It is another object to operate the process in a manner whereby the amount of water used in the extraction unit is decreased substantially.

It is another object to operate the system in a manner whereby the demand for recycle water is reduced, thereby increasing the retention time of the water in the settling unit.

In accordance with the invention, two separate settling zones are provided adjacent the extraction plant. The tailings stream from the extraction plant is fed into the first zone, and the coarse solids are deposited there in the form of a beach. Some of the tailings water, carrying suspended fines, is unavoidably trapped in the void spaces between the grains of beach sand. In this way, some fines are removed from the system. Part of the remaining tailings water is pumped to the second zone for settling of fines in the conventional manner. The balance of the tailings water, carrying a relatively high quantity of suspended fines, is recycled to the extraction process. Now, the extraction plant itself is operated in a unique manner; more particularly, the extraction process is carried out using substantially less water than has heretofore been the case; preferably, only the minimum amount of water needed to carry out satisfactory flotation to yield bitumen recoveries in the order of 92 percent is used. The tailings stream from this operation is not pumpable. However, it is rendered pumpable by adding to it the water recycled from the first settling zone.

In this way, the following advantages accrue to the process:

1. By using a reduced amount of water in extraction, made possible by the recycling of decanted tailings water from the first settling zone, the concentration of fines in the tailings water entering the first tailings zone is increased and a greater portion of the fines originally in the tar sand is trapped in the beach;

2. The life of the settling pond is increased because the amount of sludge-forming fines entering it is reduced;

3. The clarification of water in the settling pond is improved because the retention time in the pond is increased, due to reduced demand for clarified process water; and 4. The quality of water used in extraction is improved as a greater proportion of the water used is fresh water, although the amount of fresh water used in the process is not actually changed — in addition, the water recycled from the second settling zone is cleaner than would otherwise be the case.

DESCRIPTION OF THE DRAWING

In the drawing, FIG. 1 is a block diagram illustrating the steps of the process.

DESCRIPTION OF THE PREFERRED EMBODIMENT

The first step in the process is to provide two settling zones. Preferably this is done by mining the tar sand with dragline equipment, thereby providing a mined-out cavity which can be used as the first settling zone. However, it is to be understood that the first settling zone need not be a cavity; all that is needed is a disposal site for the sand beach, isolated from the second settling zone. A dike can be built to provide the second settling zone, which will usually be of much greater lateral extent than the first zone.

The extraction unit is preferably operated with only the minimum amount of water needed to obtain good bitumen recovery, e.g., in the order of 92 percent. Preferably this may be done by using in the order of 50 to 70 pounds of water per 100 pounds of tar sand. Of this amount, about 20 pounds is fresh water and the balance is water recycled from the second settling zone.

The tailings from the extraction process are pumped to the first settling zone. Here the coarse sand immediately falls out and forms a beach, trapping about 17 pounds of the tailings water per 100 pounds of tar sand processed in its void spaces. The tailings water has fines suspended in it.

The water collecting in the first settling zone is then withdrawn and divided into two streams. The first stream is recycled to the extraction plant to fluidize the tailings to render them pumpable to the first settling zone. The second stream is transferred to the second settling zone for prolonged settling of the contained fines.

In an alternative version of the invention, some of the sludge may be withdrawn from the second settling zone and mixed with the first stream being recycled from the first settling zone to fluidize the tailings. In this manner, the concentration of fines suspended in the tailings water may be increased, to thereby increase the proportion of fines trapped in the beach.

While the invention has been described above with respect to certain embodiments thereof, it will be understood by those skilled in the art that various changes and modifications may be made without departing from the spirit and scope of the invention.

What is claimed is:

1. In the process of extracting bitumen from tar sand wherein the tar sand is combined with hot water and subjected to flotation to produce separate froth and tailings streams, said tailings stream comprising coarse solids particles and fine solids particles, the improvement which comprises:

providing first and second settling zones separate from each other and located adjacent the process plant;

pumping the tailings stream into the first settling zone to settle out the coarse solids particles and form a beach, thereby trapping a portion of the tailings water and suspended fine solids particles in the void spaces in the beach and producing decanted water containing suspended fine solids particles;

withdrawing a portion of the decanted water and combining it with the tailings stream, leaving the flotation operation, to dilute it and render it pumpable whereby it may be pumped to the first settling zone; and withdrawing a second portion of the decanted water and transferring it to the second zone for settling of suspended fine solids particles.

2. The process as set forth in claim 1 wherein:

the tar sand fed to the flotation operation is combined with only the amount of hot water required for effective extraction of bitumen as froth.

* * * * *